(12) United States Patent
Mao

(10) Patent No.: US 12,719,964 B2
(45) Date of Patent: Aug. 25, 2026

(54) APPLICATION PUSH METHOD, APPARATUS, DEVICE, AND STORAGE MEDIUM

(71) Applicant: Beijing Zitiao Network Technology Co., Ltd., Beijing (CN)

(72) Inventor: Yefei Mao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 1 day.

(21) Appl. No.: 18/394,635

(22) Filed: Dec. 22, 2023

(65) Prior Publication Data

US 2024/0236201 A1 Jul. 11, 2024

(30) Foreign Application Priority Data

Jan. 6, 2023 (CN) ........................ 202310020444.0

(51) Int. Cl.
*H04L 67/55* (2022.01)
*G06F 16/435* (2019.01)
*H04L 67/50* (2022.01)
*H04N 21/239* (2011.01)

(52) U.S. Cl.
CPC ............ *H04L 67/55* (2022.05); *G06F 16/435* (2019.01); *H04L 67/535* (2022.05); *H04N 21/2393* (2013.01)

(58) Field of Classification Search
CPC ....... H04L 67/50; H04L 67/55; H04N 21/239; G06F 16/435
See application file for complete search history.

(56) References Cited

U.S. PATENT DOCUMENTS

2017/0331771 A1* 11/2017 Kushnir .............. H04L 67/5682
2017/0359279 A1* 12/2017 Peterson ................ H04W 4/12
2018/0217864 A1* 8/2018 Kumar .................... H04L 67/10
2023/0306862 A1* 9/2023 Hastreiter ............. G09B 5/065

FOREIGN PATENT DOCUMENTS

CN 103440439 B 3/2016
CN 105824873 A 8/2016
CN 106375779 A 2/2017
CN 108347651 A 7/2018
CN 110062106 A 7/2019

(Continued)

OTHER PUBLICATIONS

International Search Report for PCT Patent Application No. PCT/CN2024/070327, mailed on Apr. 3, 2024, 6 pages (3 pages of English Translation and 3 pages of Original Document).

(Continued)

*Primary Examiner* — Emmanuel L Moise
*Assistant Examiner* — Xiang Yu

(57) ABSTRACT

The embodiments of the present disclosure provide an application push method, apparatus, device, and storage medium. The method comprises: acquiring a current playing request initiated by a user in a first application; if it is determined that the current playing request meets a preset application push condition according to a historical playing record of the user in the first application, then generating and presenting a push entry of a second application; in response to a trigger operation for the push entry of the second application, starting the second application.

14 Claims, 4 Drawing Sheets

(56) References Cited

FOREIGN PATENT DOCUMENTS

| | | | |
|---|---|---|---|
| CN | 110704672 | A | 1/2020 |
| CN | 115086700 | A | 9/2022 |
| CN | 109840113 | B | 11/2022 |
| CN | 116033009 | A | 4/2023 |
| WO | 2017/120834 | A1 | 7/2017 |
| WO | 2019/149058 | A1 | 8/2019 |
| WO | 2022/160603 | A1 | 8/2022 |

OTHER PUBLICATIONS

First Office Action for Chinese Application No. 202310020444.0, mailed Oct. 9, 2024, 9 pages.
Supplementary European Search Report for EP Patent Application No. 24738485.2, Issued on Oct. 2, 2025, 12 pages.

* cited by examiner

APPLICATION PUSH METHOD, APPARATUS, DEVICE, AND STORAGE MEDIUM

CROSS REFERENCE TO RELATED APPLICATIONS

The present application is based on and claims priority to Chinese Patent Application No. 202310020444.0 filed on Jan. 6, 2023, the disclosure of which is incorporated by reference herein in its entirety.

TECHNICAL FIELD

Embodiments of the present disclosure relate to the field of computer technologies, and in particular to an application push method, apparatus, device, and storage medium.

BACKGROUND

With the rapid development of computer technologies, various types of applications emerge endlessly, wherein video applications are particularly popular among people due to their rich contents. In the process of using the video applications by users, it is found that, in addition to the demand for watching videos of various themes, users also need to play some songs, but the need of playing songs is sometimes not satisfied.

SUMMARY

The present disclosure provides an application push method, apparatus, device, and storage medium to trigger presentation of a push entry of a second application through a playing request of a user in a first application, which increases efficiency for pushing the second application, and promotes user consumption through the second application.

In a first aspect, an embodiment of the present disclosure provides an application push method, comprising:

acquiring a current playing request initiated by a user in a first application;

if it is determined that the current playing request meets a preset application push condition according to a historical playing record of the user in the first application, then generating and presenting a push entry of a second application;

in response to a trigger operation for the push entry of the second application, starting the second application.

In a second aspect, an embodiment of the present disclosure further provides an application push apparatus, comprising:

an acquisition module for acquiring a current playing request initiated by a user in a first application;

an application push module for generating and presenting, if it is determined that the current playing request meets a preset application push condition according to a historical playing record of the user in the first application, a push entry of a second application;

a trigger start module, for starting, in response to a trigger operation for the push entry of the second application, the second application.

In a third aspect, an embodiment of the present disclosure further provides an electronic device, the electronic device comprising:

one or more processors;

a storage apparatus, for storing one or more programs, when being executed by the one or more processors, the one or more programs causing the one or more processors to implement the application push method according to the embodiment of the present disclosure.

In a fourth aspect, an embodiment of the present disclosure further provides a storage medium containing computer executable instructions which, when being executed by a computer processor, are used for performing the application push method according to the embodiment of the present disclosure.

BRIEF DESCRIPTION OF THE DRAWINGS

The above and other features, advantages, and aspects of the respective embodiments of the present disclosure will become more apparent by referring to the following embodiments in conjunction with the accompanying drawings. Throughout the drawings, the same or similar reference numbers refer to the same or similar elements. It should be understood that the drawings are illustrative and that elements and components are not necessarily drawn to scale.

DETAILED DESCRIPTION

Figure 1:
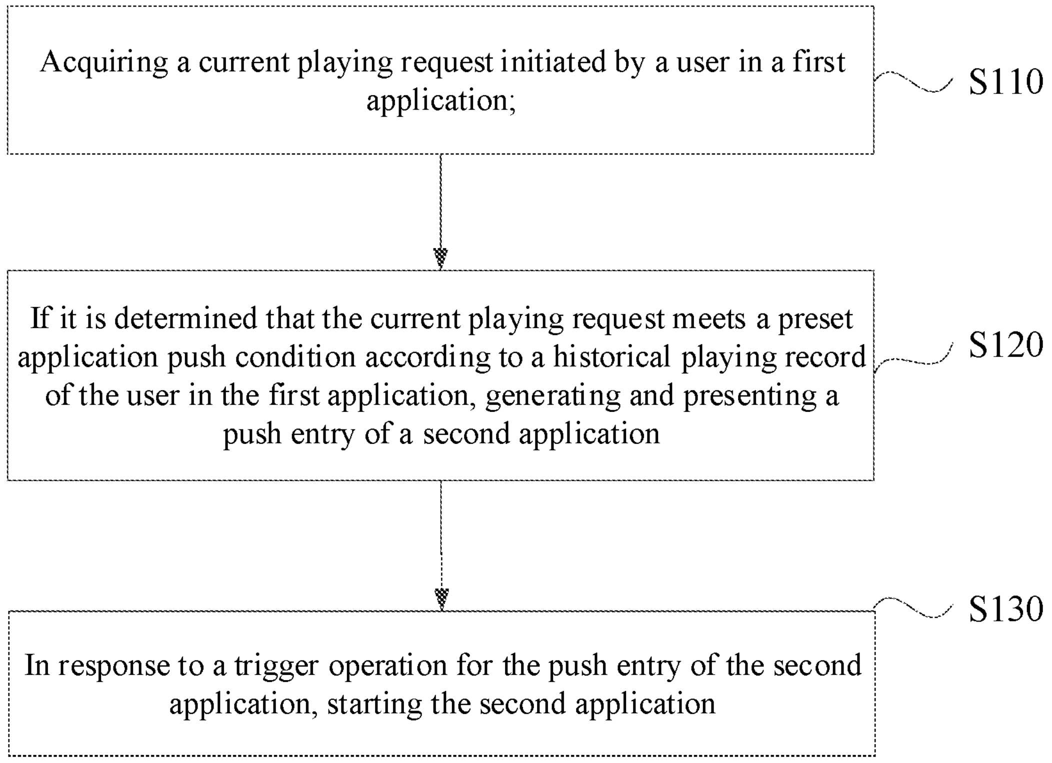
FIG. 1 is a schematic flow diagram of an application push method as provided in an embodiment of the present disclosure.

Embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, but rather are provided for a more complete and thorough understanding of the present disclosure. It should be understood that the drawings and the embodiments of the present disclosure are for illustration purposes only and are not intended to limit the scope of the present disclosure.

It should be understood that the respective steps recited in the method embodiments of the present disclosure may be performed in a different order, and/or performed in parallel. Moreover, the method embodiments may include additional steps and/or omit performing the illustrated steps. The scope of the present disclosure is not limited in this respect.

The term "including" and variations thereof as used herein are intended to be open-ended, i.e., "including but not limited to". The term "based on" is "based at least in part on"; the term "one embodiment" means "at least one embodiment"; the term "another embodiment" means "at least one additional embodiment"; the term "some embodiments" means "at least some embodiments". Relevant definitions for other terms will be given in the following description.

It should be noted that "first", "second", and other concepts mentioned in the present disclosure are only used for distinguishing different apparatuses, modules or units, and are not used for limiting the order or interdependence of the functions performed by the apparatuses, modules or units.

It should be noted that, "one" or "more" as mentioned in the present disclosure are intended to be illustrative rather than limiting, and that those skilled in the art should understand that they should be understood as "one or more" unless the context clearly indicates otherwise.

The names of messages or information exchanged between multiple apparatuses in the embodiments of the present disclosure are for illustrative purposes only, and are not intended to limit the scope of these messages or information.

It is understood that, before the technical solutions disclosed in the respective embodiments of the present disclosure are used, the user should be notified of the type, the use range, the use scene, etc. of the personal information involved in the present disclosure in a proper way according to the relevant laws and regulations, and user authorization should be acquired.

For example, in response to reception of a user's active request, prompt information is sent to the user to explicitly prompt the user that the operation requested to be performed will need to acquire and use the user's personal information. Thus, the user can autonomously select whether to provide personal information to software or hardware such as an electronic device, an application program, a server, or a storage medium that performs operations of the technical solution of the present disclosure, according to the prompt information.

As an alternative but non-limiting implementation, the mode of sending prompt information to a user in response to reception of a user's active request may be, for example, a pop-up window mode, and the prompt information may be presented in a text mode in the pop-up window. In addition, the pop-up window may also carry a selection control for the user' selection of "agreeing" or "disagreeing" to provide personal information to the electronic device.

It is understood that the above notification and user authorization acquisition process is only illustrative and is not intended to limit the implementation of the present disclosure. Other modes that comply with the relevant laws and regulations may also be applied to the implementation of the present disclosure.

It is understood that the data involved in the present technical solution, including but not limited to the data itself, acquisition or use of the data, should comply with the requirements of the corresponding laws and regulations and the related provisions.

FIG. 1 is a schematic flow diagram of an application push method as provided in an embodiment of the present disclosure. The embodiment of the present disclosure is applicable to a situation where a second application is pushed to the user to promote user consumption, when the first application cannot meet a user consumption demand according to operation permissions of a user in a first application. The method may be performed by an application push apparatus, and the apparatus may be implemented in form of software and/or hardware, or alternatively, implemented by an electronic device which can be a mobile terminal, a PC terminal, a server, or the like.

As shown in FIG. 1, the method comprises:

S110, acquiring a current playing request initiated by a user in a first application.

The first application refers to application software for a user to perform multimedia playing currently. The user can play any video in the first application or play part of songs within operation permissions in the first application. The current playing request is an operational behavior for playing multimedia in the first application. For example, the current playing request may be a request for starting play, a request for rewind play, a request for fast forward play, a request for playing next track or a request for playing previous track, etc., which is initiated by the user for a specified song in the first application.

In the present embodiment, after the user initiates a current playing request for certain multimedia in the first application, the current playing request initiated by the user is acquired, and whether the current playing request triggers a push operation for a second application is further judged.

S120, if it is determined that the current playing request meets a preset application push condition according to a historical playing record of the user in the first application, then generating and presenting a push entry of a second application.

The historical playing record is an operational behavior for playing multimedia in the first application. For example, for a song played by the user in the first application, the historical playing record can at least includes: singer, song name, play date, and play times. The application push condition may be used for judging whether the current playing request can trigger a push for the second application in the first application to recommend the second application to the user. The second application refers to application software for multimedia playing. The push entry of the second application can enable jumping from the current playing page of the first application to a specified page of the second application.

Alternatively, determining that the current playing request meets a preset application push condition according to a historical playing record of the user in the first application includes: identifying whether the current playing request is beyond operation permissions of the user according to the historical playing record of the user in the first application; if the current playing request is beyond the operation permissions of the user, then determining that the current playing request meets the preset application push condition.

In the present embodiment, due to multimedia copyright or other reason, the user cannot play various multimedia as desired in the first application, but can only play multimedia within certain operation permissions of the user. For example, the user can only play 10 different songs once in the first application every day, and a multimedia playing request that is beyond the operation permissions will be rejected by the first application. Therefore, after acquiring the current playing request, it is needed to acquire the historical playing record of the user in the first application, and determine the remaining operation permissions of the user in the first application according to the historical playing record, so as to determine whether the current playing request is beyond the operation permissions of the user. If the current playing request is beyond the operation permissions of the user, then the first application does not allow the multimedia corresponding to the current playing request to be played, but it is possible to jump to the second application for playing because the current playing request meets the application push condition at this moment.

In an alternative implementation, generating and presenting a push entry of a second application includes: determining an operation target that can meet the current playing request according to the operation permissions that the current playing request is beyond; generating and presenting a push entry of the second application that can meet the operation target.

In the present embodiment, when the current playing request is beyond the operation permissions of the user, it is impossible to play the multimedia corresponding to the current playing request in the first application, but it is possible to push a second application to the user so as to promote user consumption in consideration that the second application is an application for multimedia playing. The multimedia corresponding to the current playing request is taken as the operation target, a playing page corresponding to the operation target in the second application is determined, and a playing component linked to the playing page is taken as a push entry of the second application and presented to the user.

Alternatively, generating and presenting a push entry of a second application that can meet the operation target includes: generating a push entry of the second application according to the current playing request; presenting the push entry in an operation page of the current playing request.

In the present embodiment, after the operation target corresponding to the current playing request is determined, a playing page of the operation target in the second application is linked to a playing component as a push entry of the second application. Then, the push entry is presented in the operation page of the current playing request, so that when a user clicks the push entry in the operation page, it is possible to jump to the second application to perform multimedia playing.

In another alternative implementation, generating and presenting a push entry of a second application includes: generating a push entry of a second application according to the current playing request, and presenting the push entry in a push page.

The push page is a new page different from the operation page of the current playing request. In the present embodiment, after generating the push entry of the second application according to the current playing request, it is also possible to jump from the operation page of the current playing request to the newly generated push page of the second application, and present the push entry of the second application in the push page, so that when the user clicks the push entry in the push page, the page jumps to the second application to perform multimedia playing.

S130, in response to a trigger operation for the push entry of the second application, starting the second application.

In the present embodiment, when the push entry of the second application is presented in the operation page of the current playing request of the first application, if the user clicks the push entry in the current operation page, then the second application is started, and it is jumped to a playing page of the operation target in the second application. When the push entry of the second application is presented in the push page of the first application, if the user clicks the push entry in the push page, then the second application is started, and it is jumped to a playing page of the operation target in the second application.

By acquiring a current playing request initiated by a user in a first application; generating and presenting a push entry of a second application, if it is determined that the current playing request meets a preset application push condition according to a historical playing record of the user in the first application; starting the second application in response to a trigger operation for the push entry of the second application, the technical solution of the embodiment of the present disclosure solves the problem that the first application cannot meet the demand for user's consumption. It triggers presentation of the push entry of the second application through a playing request of the user in the first application, which increases efficiency for pushing the second application, and promotes user's consumption through the second application.

Figure 2:
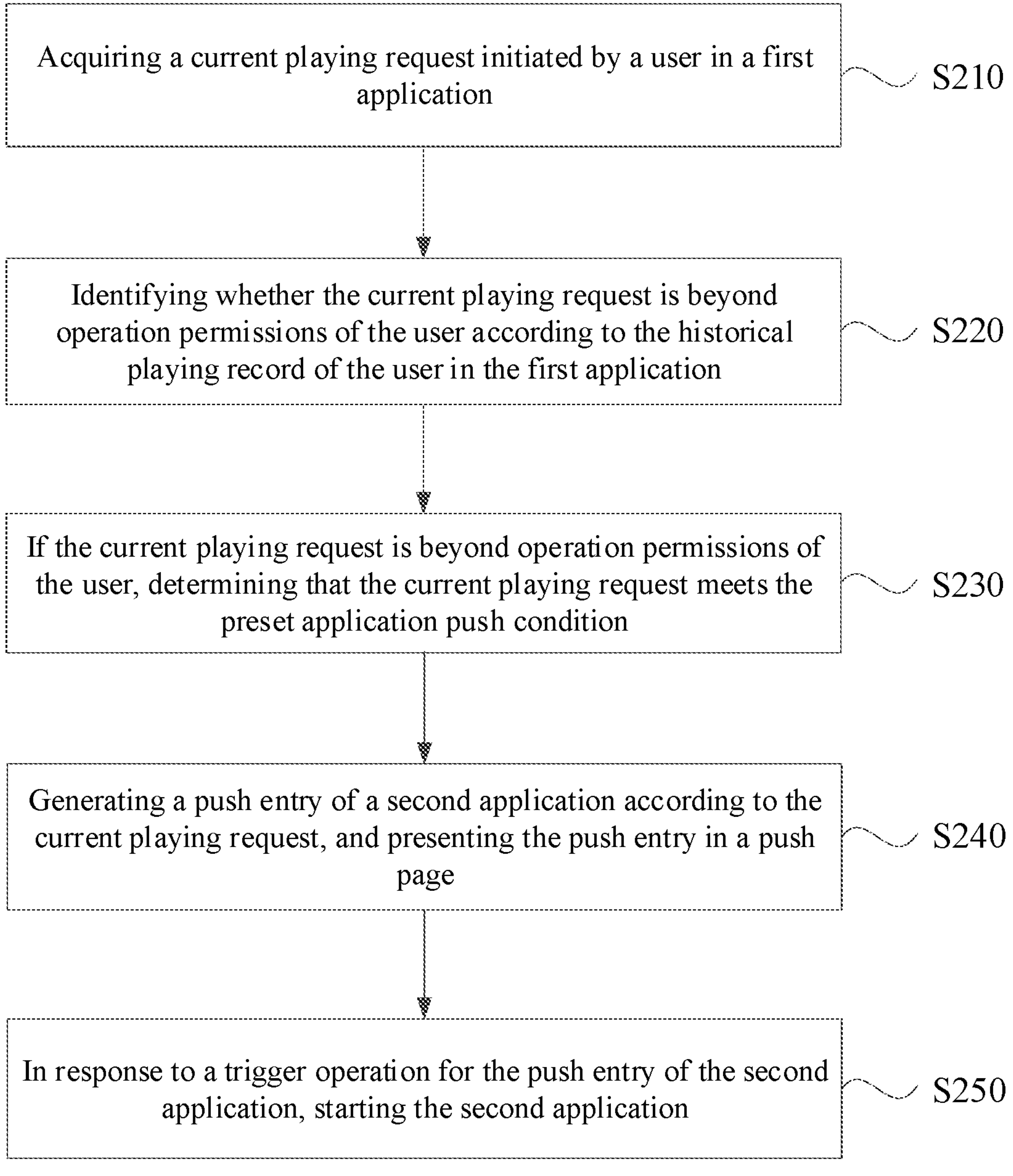
FIG. 2 is a schematic flow diagram of another application push method as provided in an embodiment of the present disclosure.

FIG. 2 is a schematic flow diagram of another application push method as provided in an embodiment of the present disclosure. On the basis of the above-mentioned embodiment, the present embodiment further provides a specific step of identifying whether the current playing request is beyond operation permissions of the user according to a historical playing record of the user in the first application, and a specific step of simultaneously presenting a push entry and recommendation information in a push page. As shown in FIG. 2, the method comprises:

S210, acquiring a current playing request initiated by a user in a first application.

The current playing request is an operational behavior for playing multimedia in the first application.

S220, identifying whether the current playing request is beyond operation permissions of the user according to a historical playing record of the user in the first application.

In the present embodiment, the historical playing record is an operational behavior for playing multimedia in the first application, and the historical playing record may reflect a consumption condition of the operation permissions of the user in the first application. Illustratively, the historical playing record may include: singer, song name, play date, and play times of the songs played by the user in the first application on the current day. If the operation permission of the user in the first application is that only 10 songs can be played once every day, then how many songs the user has played today can be determined according to the historical playing record after acquiring the current playing request initiated by the user, and whether the current playing request is beyond the operation permissions of the user is further identified, that is, whether the song requested to be played currently can be played in the first application is determined.

Alternatively, identifying whether the current playing request is beyond operation permissions of the user according to the historical playing record of the user in the first application includes: acquiring the historical playing record of the user in the first application; identifying that the current playing request is beyond the operation permissions of the user if the current playing request and the historical playing record meet the following conditions: a playing object of the current playing request overlaps with a playing object in the historical playing record; and play times of the historical playing record reaches a preset upper limit of play times.

In the present embodiment, the operation permissions of the user in the first application can be set as follows: only a preset number of songs can be played every day, and the same song cannot be repeatedly played. After acquiring the current playing request initiated by the user, the historical playing record generated by the user in the first application on the same day can be acquired, and statistics analysis of the historical playing record can be performed. Whether the playing object of the current playing request overlaps with the playing object in the historical playing record is judged. If yes, then it indicates that the song requested to be played currently has been played today, so the current playing request is beyond the operation permissions of the user and the song requested cannot be played in the first application. If the playing object of the current playing request does not overlap with the playing object in the historical playing record, then it indicates that the song requested to be played currently has not been played yet today. At this time, how many songs have been played today before the playing object of the current playing request and whether the number of the songs reaches a preset upper limit of the play times can be further judged according to the play times of the historical playing record. If the preset upper limit of the play times has not been reached yet, then the current playing request does not go beyond the operation permissions of the user, and the song requested to be played currently can be played in the first application; if the preset upper limit of the play times has been reached, then the current playing request has been beyond the operation permissions of the user, and the song requested to be played currently will not be played in the first application.

It should be noted that, for the conditions that the playing object of the current playing request overlaps with the playing object in the historical playing record and that the play times of the historical playing record reaches the preset upper limit of the play times, the current playing request is considered as going beyond the operation permissions of the user as long as the current playing request and the historical playing record meet any of the above-mentioned two conditions, and when both of the above-mentioned two conditions are not met, the current playing request is considered as not going beyond the operation permissions of the user.

S230, if the current playing request is beyond operation permissions of the user, then determining that the current playing request meets the preset application push condition.

In the present embodiment, when the current playing request is beyond the operation permissions of the user in the first application, the playing object of the current playing request must not be played in the first application, that is, the first application cannot meet the consumption demand of the user. At this time, the current playing request is consider as meeting the application push condition, and a second application for multimedia playing can be pushed to the user based on the demand of the user for playing the playing object of the current playing request, so as to promote user consumption through the second application while increasing a success rate for pushing the second application.

S240, generating a push entry of a second application according to the current playing request, and presenting the push entry in a push page.

In the present embodiment, if the playing object of the current playing request is a specified song, for example, the user wants to play Song XX repeatedly, or the user selects the $11^{th}$ Song XX in the song playlist on the premise that only 10 different songs can be played, then the playing page of the specified Song XX in the second application is linked to a playing component as the push entry of the second application, and thereafter, the push entry of the second application can be presented on, optionally, an operation page of the current playing request.

If the playing object of the current playing request is not a certain specified song, for example, the user selects a next song to be played after having played 10 different songs in a random play mode, then a push entry of the second application is generated according to the current playing request, for example, a song preferred by the user is selected according to the historical playing record and the playing page of this song in the second application is linked to a playing component as the push entry of the second application, and thereafter it is jumped from the current operation page to a newly generated push page, and present the push entry of the second application in the push page.

Alternatively, while generating and presenting the push entry of the second application, the method further comprises: determining recommendation information that can be presented in the second application according to the historical playing record and/or current playing request of the user; presenting the recommendation information along with the push entry.

Figure 3:
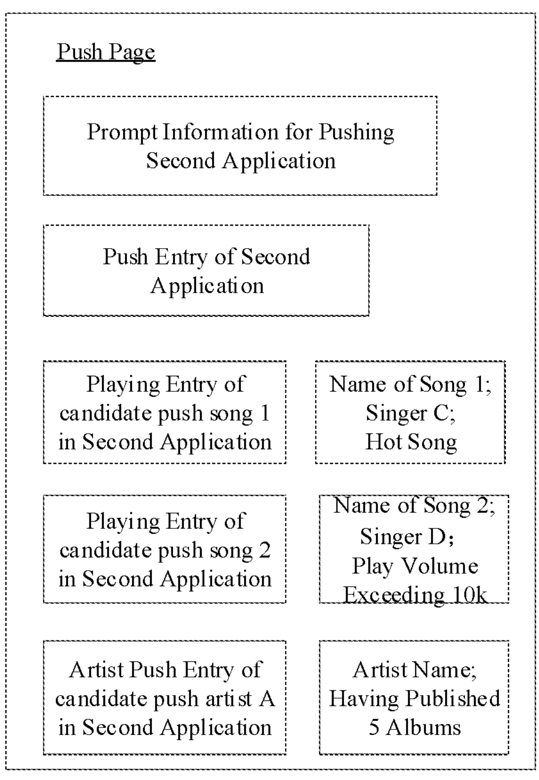
FIG. 3 is a schematic diagram of an application push entry as provided in an embodiment of the present disclosure.

In the present embodiment, in order to further arouse the interest of the user and improve success rate for pushing the second application, a song type or artist type the user likes can be determined according to the historical playing record and/or current playing request of the user while generating and presenting the push entry of the second application. Then, at least one candidate pushed song corresponding to the song type can be selected, and a playing entry of the candidate pushed song in the second application and the related song information are used as recommendation information. It is also possible to select at least one candidate pushed artist matched with the artist type, and use the artist push entry of the candidate pushed artist in the second application and the related artist information as recommendation information. The recommendation information is placed in the push page along with the push entry for presentation, as shown in FIG. 3.

Alternatively, determining recommendation information that can be presented in the second application according to the historical playing record and/or current playing request of the user includes: determining content associated with the historical playing record according to the historical playing record of the user, and determining recommendation information that can be presented in the second application according to the associated content.

In the present embodiment, the song type that the user likes, such as national style songs, movie songs, love songs and the like, can be determined by performing statistical analysis on the playing objects in the historical playing records; or determine the artist type that the user likes, such as Chinese male singers, European and American female singers, and the like, by performing statistical analysis for singers in the historical playing record. Then, at least one hot song or new song under the song type that the user likes is selected as a candidate pushed song, and the song name, the singer and the song popularity information of the candidate pushed song are used as related song information, which is used as the recommendation information along with the playing entry of the candidate pushed song in the second application. It is also possible to select at least one artist under the artist type that the user likes as the candidate pushed artist, and use the artist name and the number of released albums of the candidate pushed artist as related artist information, which is used as recommendation information along with the artist push entry generated according to a personal singles playlist page of the candidate pushed artist in the second application.

The hot song can be a song in the first application with a sum of play times and use times larger than a first threshold, for example, a song of which the sum of play times and forwarding times is larger than 1 hundred million. The new song can be a song of which the days since it was launched in the first application is less than a second threshold, for example, a song of which the days since it was launched is less than 2 weeks. The song popularity information can include that the song is a hot song, or that the song is a new song, or that the song has a play volume of 1.2 k, etc.

S250, in response to a trigger operation for a push entry of the second application, starting the second application.

In the present embodiment, in response to a trigger operation for a push entry of the second application, whether the second application has been downloaded in the current device is judged; if the second application has not been downloaded, then it is jumped to an application download page to download the second application; if the second application has been downloaded, then start the second application, and jump to a playing page corresponding to the push entry in the second application.

In the embodiment, in response to a trigger operation for the playing entry of the candidate pushed song or the artist push entry in the push page, whether the second application has been downloaded in the current device is judged; if the second application has not been downloaded, then it is jumped to an application download page to download the second application; if the second application has been downloaded, then the second application is started, and it is jumped to a playing page of the candidate pushed song or the personal singles playlist page of the candidate pushed artist in the second application.

By acquiring a current playing request initiated by a user in a first application; generating and presenting a push entry of a second application, if it is determined that the current playing request meets a preset application push condition according to a historical playing record of the user in the first application; starting the second application in response to a trigger operation for the push entry of the second application, the technical solution of the embodiment of the present disclosure solves the problem that the first application cannot meet the user consumption demand. It triggers presentation of the push entry of the second application through a playing request of the user in the first application, which increases efficiency for pushing the second application, and promotes user consumption through the second application.

Figure 4:
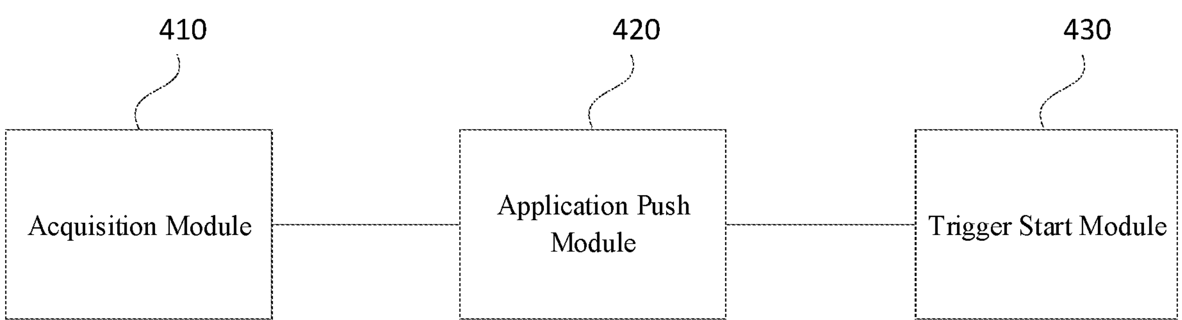
FIG. 4 is a schematic structural diagram of an application push apparatus as provided in an embodiment of the present disclosure.

FIG. 4 is a schematic structural diagram of an application push apparatus as provided in an embodiment of the present disclosure. As shown in FIG. 4, the apparatus comprises: an acquisition module 410, an application push module 420, and a trigger start module 430.

The acquisition module 410 is used for acquiring a current playing request initiated by a user in a first application.

The application push module 420 is used for generating and presenting a push entry of a second application, if it is determined that the current playing request meets the preset application push condition according to the historical playing record of the user in the first application.

The trigger start module 430 is used for starting the second application in response to a trigger operation for a push entry of the second application.

By acquiring a current playing request initiated by a user in a first application; generating and presenting a push entry of a second application, if it is determined that the current playing request meets a preset application push condition according to a historical playing record of the user in the first application; starting the second application in response to a trigger operation for the push entry of the second application, the technical solution of the embodiment of the present disclosure solves the problem that the first application cannot meet the user consumption demand. It triggers presentation of the push entry of the second application through a playing request of the user in the first application, which increases efficiency for pushing the second application, and promotes user consumption through the second application.

Alternatively, the application push module 420 includes:

an identification unit for identifying whether the current playing request is beyond operation permissions of the user according to a historical playing record of the user in the first application;

a determination unit for determining that the current playing request meets the preset application push condition, if the current playing request is beyond operation permissions of the user.

Alternatively, the identification unit is used for:

acquiring the historical playing record of the user in the first application;

identifying that the current playing request is beyond the operation permissions of the user, if the current playing request and the historical playing record meet the following conditions:

the playing object of the current playing request overlaps with the playing object in the historical playing record;

the play times of the historical playing records reaches a preset upper limit of the play times.

Alternatively, the application push module 420 includes:

an operation target determination unit for determining an operation target that can meet the current playing request, according to the operation permissions that the current playing request is beyond;

a first presentation unit for generating and presenting a push entry of a second application that can meet the operation target.

Alternatively, the first presentation unit is used for:

generating a push entry of a second application according to the current playing request;

presenting the push entry in an operation page of the current playing request.

Alternatively, the application push module 420 includes:

a second display unit for generating a push entry of a second application according to the current playing request, and presenting the push entry in a push page.

Alternatively, while recommending and presenting a push entry for generating the second application, the apparatus further comprises:

a recommendation information determination unit for determining recommendation information that can be presented in the second application according to the historical playing record and/or current playing request of the user;

a common presentation unit for presenting the recommendation information along with the push entry.

Alternatively, the recommendation information determination unit is used for:

determining content associated with the historical playing record according to a historical playing record of the user, and determining recommendation information that can be presented in the second application according to the associated content.

Alternatively, the current playing request and historical playing record are operational behaviors for playing multimedia in the first application.

The application push apparatus as provided in the embodiment of the present disclosure can perform the application push method as provided in any embodiment of the present disclosure, and has the corresponding functional modules and beneficial effects for performing the method.

It is worth noting that, the respective units and modules comprised in the above-mentioned apparatus are merely divided according to functional logic, but are not limited to the above division as long as the corresponding functions can be realized. In addition, specific names of the respective functional units are also only for convenience of distinguishing one from another, and are not used for limiting the protection scope of the embodiment of the present disclosure.

Figure 5:
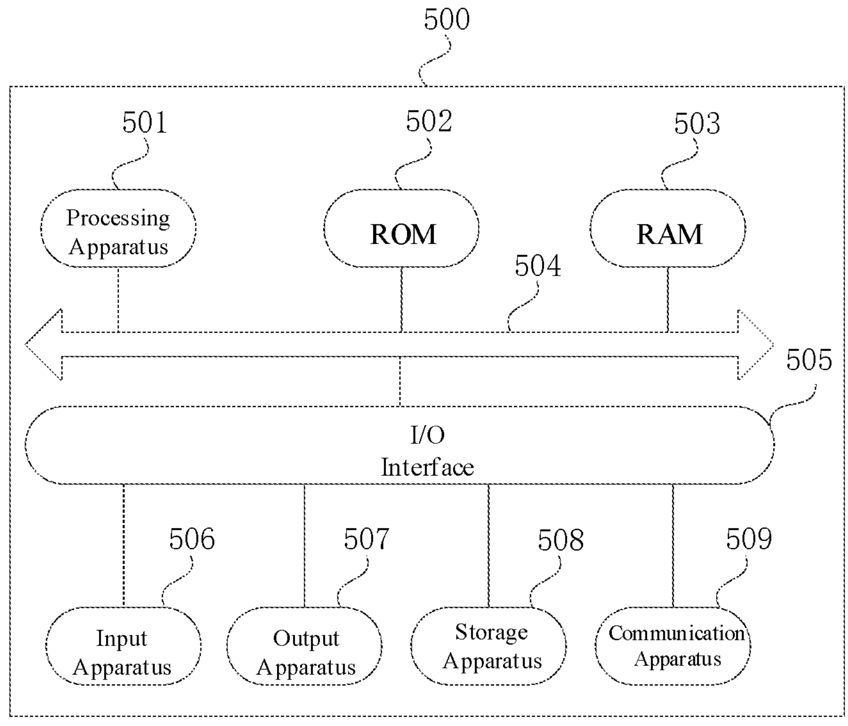
FIG. 5 is a schematic structural diagram of an electronic device as provided in an embodiment of the present disclosure.

FIG. 5 is a schematic structural diagram of an electronic device as provided in an embodiment of the present disclosure. Referring now to FIG. 5, a schematic structural diagram of an electronic device (e.g., a terminal device or a server in FIG. 5) 500 adaptive for implementing the embodiment of the present disclosure is shown. The terminal device in the embodiment of the present disclosure may include, but is not limited to, mobile terminals, such as mobile phone, laptop computer, digital broadcast receiver, PDA (personal digital assistant), PAD (tablet computer), PMP (portable multimedia player), vehicle-mounted terminal (e.g., vehicle-mounted navigation terminal), and the like, as well as fixed terminals such as digital TV, desktop computer, and the like. The electronic device shown in FIG. 5 is only an example, and should not bring any limitation to the functions and the scope of use of the embodiment of the present disclosure.

As shown in FIG. 5, the electronic device 500 can include a processing apparatus (e.g., a central processor, a graphics processor, and etc.) 501 which may perform various appropriate actions and processes according to programs stored in a Read Only Memory (ROM) 502 or programs loaded from a storage apparatus 508 onto a Random Access Memory (RAM) 503. In the RAM 503, various programs and data required for operations of the electronic device 500 are also stored. The processing apparatus 501, the ROM 502, and the RAM 503 are connected to each other via a bus 504. An input/output (I/O) interface 505 is also connected to the bus 504.

Generally, the following apparatuses can be connected to the I/O interface 505: input apparatus 506 including, for example, touch screen, touch pad, keyboard, mouse, camera, microphone, accelerometer, gyroscope, and the like; output apparatus 507 including, for example, Liquid Crystal Display (LCD), speaker, vibrator, and the like; storage apparatus 508 including, for example, magnetic tape, hard disk, and the like; and a communication apparatus 509. The communication apparatus 509 may allow the electronic device 500 to perform wireless or wired communication with other device to exchange data. While FIG. 5 illustrates the electronic device 500 having various apparatuses, not all illustrated apparatuses are required to be implemented or provided. More or fewer apparatuses can be alternatively implemented or provided.

In particular, the process described above with reference to the flow diagram may be implemented as a computer software program, according to the embodiment of the present disclosure. For example, the embodiment of the present disclosure comprises a computer program product comprising a computer program carried on a non-transitory computer readable medium, the computer program containing program code for performing the method as illustrated in the flow diagram. In such an embodiment, the computer program may be downloaded and installed from a network through the communication apparatus 509, or installed from the storage apparatus 508, or installed from the ROM 502. The computer program, when being executed by the processing apparatus 501, performs the above-described functions defined in the method of the embodiment of the present disclosure.

The names of messages or information exchanged between a plurality of apparatuses in the embodiment of the present disclosure are for illustrative purposes only, and are not intended to limit the scope of these messages or information.

The electronic device as provided in the embodiment of the present disclosure and the application push method as provided in the above-mentioned embodiment belong to the same inventive concept. Technical details that are not described in detail in the embodiment may refer to the above-mentioned embodiment, and the present embodiment and the above-mentioned embodiment have the same beneficial effects.

The embodiment of the present disclosure provides a computer storage medium, on which a computer program is stored, and the program, when being executed by a processor, implements the application push method as provided in the above-mentioned embodiment.

It should be noted that the above-mentioned computer readable medium of the present disclosure may be a computer readable signal medium or a computer readable storage medium or any combination of both of the above. The computer readable storage medium may be, for example, but not limited to, electronic, magnetic, optical, electromagnetic, infrared, or semiconductor system, apparatus, or device, or any combination of the above. More specific examples of the computer readable storage medium may include, but are not limited to: electrical connection having one or more wires, portable computer diskette, hard disk, Random Access Memory (RAM), Read Only Memory (ROM), Erasable Programmable Read Only Memory (EPROM or flash memory), optical fiber, Portable Compact disc Read Only Memory (CD-ROM), optical storage component, magnetic storage component, or any appropriate combination of the above. In the present disclosure, the computer readable storage medium may be any tangible medium containing or storing programs for use by or in combination with an instruction execution system, apparatus, or device. In contrast, in the present disclosure, the computer readable signal medium may include a data signal propagated in baseband or as part of carrier wave, wherein computer readable program code is carried. Such a propagated data signal may take any of a variety of forms, including, but not limited to, an electromagnetic signal, an optical signal, or any suitable combination of the above. The computer readable signal medium may be any computer readable medium other than a computer readable storage medium and may transmit, propagate, or transport programs for use by or in combination with an instruction execution system, apparatus, or device. Program code carried on the computer readable medium may be transported using any appropriate medium, including but not limited to: electrical wires, optical cables, RF (radio frequency), etc., or any suitable combination of the above.

In some embodiments, clients and servers may perform communication using any currently known or future developed network Protocol, such as the HyperText Transfer Protocol (HTTP), and may be interconnected with any form or medium of digital data communication (e.g., a communication network). Examples of the communication network include a Local Area Network ("LAN"), a Wide Area Network ("WAN"), a network of network (e.g., the Internet), and a peer-to-peer network (e.g., an ad hoc peer-to-peer network), as well as any currently known or future developed network.

The above-mentioned computer readable medium may be contained in the above-mentioned electronic device, or may be separate and not incorporated into the electronic device.

The above-mentioned computer readable medium carries one or more programs which, when being executed by the electronic device, cause the electronic device to: acquire a current playing request initiated by a user in a first application; if it is determined that the current playing request meets a preset application push condition according to a historical playing record of the user in the first application, generate and present a push entry of a second application; in response to a trigger operation for the push entry of the second application, start the second application.

Computer program code for performing operations of the present disclosure may be written in one or more programming languages or a combination thereof. The above programming languages include but are not limited to object oriented programming languages such as Java, Smalltalk, C++, as well as conventional procedural programming languages, such as the "C" programming language or similar programming languages. The program code may be executed entirely on a user computer, partly on the user computer, as a stand-alone software package, partly on the user computer and partly on a remote computer, or entirely on the remote computer or a server. In a situation where the remote computer is involved, the remote computer may be connected to the user computer through any type of network, including a Local Area Network (LAN) or a Wide Area Network (WAN), or may be connected to an external computer (for example, through the Internet using an Internet service provider).

The flow diagrams and block diagrams in the figures illustrate the architecture, functions, and operations of possible implementations of the system, method and computer program product according to various embodiments of the present disclosure. In this regard, each block in the flow diagrams or block diagrams may represent a module, a segment of program, or a portion of code, which contains one or more executable instructions for implementing the specified logical function (s). It should also be noted that, in some alternative implementations, the functions labeled in the block may also occur out of the order labeled in the figures. For example, two blocks shown in succession may, in fact, be executed substantially in parallel, or they may sometimes be executed in a reverse order, depending upon the functions involved. It will also be noted that each block of the block diagrams and/or flow diagrams, and combination (s) of blocks in the block diagrams and/or flow diagrams, may be implemented by dedicated hardware-based systems that perform the specified functions or operations, or by a combination of dedicated hardware and computer instructions.

The involved units as described in the embodiments of the present disclosure may be implemented by means of software or hardware. The name of a unit does not in some cases constitute a limitation of the unit itself, for example, the first acquisition unit may also be described as "a unit acquiring at least two internet protocol addresses".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), System on Chip (SOCs), Complex Programmable Logic Devices (CPLDs), and the like.

In the context of the present disclosure, a machine readable medium may be a tangible medium that may contain or store programs for use by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the above contents. More specific examples of the machine readable storage medium will include electrical connection based on one or more wires, portable computer diskette, hard disk, Random Access Memory (RAM), Read Only Memory (ROM), Erasable Programmable Read Only Memory (EPROM or flash memory), optical fiber, Portable Compact Disc Read Only Memory (CD-ROM), optical storage device, magnetic storage device, or any suitable combination of the above contents.

According to one or more embodiments of the present disclosure, Example 1 provides an application push method, comprising:

acquiring a current playing request initiated by a user in a first application;

if it is determined that the current playing request meets a preset application push condition according to a historical playing record of the user in the first application, then generating and presenting a push entry of a second application;

in response to a trigger operation for the push entry of the second application, starting the second application.

According to one or more embodiments of the present disclosure, Example 2 provides the method according to Example 1, wherein determining that the current playing request meets a preset application push condition according to a historical playing record of the user in the first application includes:

identifying whether the current playing request is beyond operation permissions of the user according to the historical playing record of the user in the first application;

if the current playing request is beyond operation permissions of the user, determining that the current playing request meets the preset application push condition.

According to one or more embodiments of the present disclosure, Example 3 provides the method according to Example 2, wherein identifying whether the current playing request is beyond operation permissions of the user according to the historical playing record of the user in the first application includes:

acquiring the historical playing record of the user in the first application;

identifying that the current playing request is beyond the operation permissions of the user if the current playing request and the historical playing record meet the following conditions:

a playing object of the current playing request overlaps with a playing object in the historical playing record;

play times of the historical playing records reaches a preset upper limit of the play times.

According to one or more embodiments of the present disclosure, Example 4 provides the method according to Example 2 or 3, wherein generating and presenting a push entry of a second application includes:

determining an operation target that can meet the current playing request according to the operation permissions that the current playing request is beyond;

generating and presenting a push entry of a second application that can meet the operation target.

According to one or more embodiments of the present disclosure, Example 5 provides the method according to Example 4, wherein generating and presenting a push entry of a second application that can meet the operation target includes:

generating a push entry of a second application according to the current playing request;

presenting the push entry in an operation page of the current playing request.

According to one or more embodiments of the present disclosure, Example 6 provides the method according to any of Examples 1 to 3, wherein generating and presenting a push entry of a second application includes:

generating a push entry of a second application according to the current playing request, and presenting the push entry in a push page.

According to one or more embodiments of the present disclosure, Example 7 provides the method according to Example 6, wherein, while generating and presenting a push entry of a second application, the method further comprises:

determining recommendation information that can be presented in the second application according to the historical playing record and/or the current playing request of the user;

presenting the recommendation information along with the push entry.

According to one or more embodiments of the present disclosure, Example 8 provides the method according to Example 7, wherein determining recommendation information that can be presented in the second application according to the historical playing record and/or the current playing request of the user includes:

determining content associated with the historical playing record according to a historical playing record of the user, and determining recommendation information that can be presented in the second application according to the associated content.

According to one or more embodiments of the present disclosure, Example 9 provides the method according to any of Examples 1 to 3, wherein the current playing request and historical playing record are operational behaviors for playing multimedia in the first application.

According to one or more embodiments of the present disclosure, Example 10 provides an application push apparatus, comprising:

an acquisition module for acquiring a current playing request initiated by a user in a first application;

an application push module for generating and presenting, if it is determined that the current playing request meets a preset application push condition according to a historical playing record of the user in the first application, a push entry of a second application;

a trigger start module for starting, in response to a trigger operation for the push entry of the second application, the second application.

According to one or more embodiments of the present disclosure, Example 11 provides an electronic device, the electronic device comprising:

one or more processors;

a storage apparatus for storing one or more programs, when being executed by the one or more processors, the one or more programs cause the one or more processors to implement an application push method according to any of Examples 1 to 9.

According to one or more embodiments of the present disclosure, Example 12 provides a storage medium containing computer executable instructions, when being executed by a computer processor, the computer executable instructions are used for performing an application push method according to any of Examples 1 to 9.

The above descriptions are only preferred embodiments of the present disclosure and explanations for the technical principles as employed. It should be understood by those skilled in the art that the disclosure scope involved in the present disclosure is not limited to the technical solution formed by the particular combination of above-mentioned technical features, but should also encompass other technical solutions formed by any combination (s) of the above-mentioned technical features or equivalents thereof, without departing from the above-disclosed concept, for example, the technical solution formed by mutual replacement of the above features and the technical features having similar functions as disclosed (but not limited to) in the present disclosure.

Besides, while various operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological actions, it should be understood that the subject matter defined in the appended Claims is not necessarily limited to the specific features or actions described above. Rather, the specific features and actions described above are only exemplary forms of implementing the Claims.

What is claimed is:

1. An application push method, comprising:

acquiring a current playing request for playing first multimedia initiated by a user in a first application;

identifying whether the current playing request is beyond operation permissions of the user in the first application according to a historical playing record of the user in the first application;

if the current playing request is beyond operation permissions of the user in the first application, rejecting playing the first multimedia in the first application, generating and presenting a push entry of a second application that meets the current playing request for playing the first multimedia, wherein the push entry is a playing component linked to a playing page corresponding to the first multimedia in the second application; and in response to a trigger operation for the push entry of the second application, jumping from the first application to the second application, wherein identifying whether the current playing request is beyond operation permissions of the user according to the historical playing record of the user in the first application includes:

identifying that the current playing request is beyond the operation permissions of the user if the current playing request and the historical playing record meet at least one of the following conditions:

a playing object of the current playing request overlaps with a playing object in the historical playing record; or a number of plays of the historical playing record reaches a preset upper limit of the number of plays.

2. The method according to claim 1, wherein identifying whether the current playing request is beyond operation permissions of the user according to the historical playing record of the user in the first application further includes:

acquiring the historical playing record of the user in the first application.

3. The method according to claim 1, wherein presenting the push entry of the second application includes:

presenting the push entry in an operation page of the current playing request.

4. The method according to claim 1, wherein presenting a push entry of a second application includes:

presenting the push entry in a push page.

5. The method according to claim 4, wherein, while generating and presenting a push entry of a second application, the method further comprising:

determining recommendation information that can be presented in the second application according to at least one of the historical playing record or the current playing request of the user;

presenting the recommendation information along with the push entry.

6. The method according to claim 5, wherein determining recommendation information that can be presented in the second application according to at least one of the historical playing record or the current playing request of the user includes:

determining content associated with the historical playing record according to the historical playing record of the user, and determining recommendation information that can be presented in the second application according to the associated content.

7. The method according to claim 1, wherein the historical playing record is operational behavior for playing multimedia in the first application.

8. An electronic device, the electronic device comprises:

one or more processors;

a storage apparatus, for storing one or more programs, when being executed by the one or more processors, the one or more programs causing the one or more processors to implement an application push method comprising:

acquiring a current playing request for playing first multimedia initiated by a user in a first application;

identifying whether the current playing request is beyond operation permissions of the user in the first application according to a historical playing record of the user in the first application;

if the current playing request is beyond operation permissions of the user in the first application, rejecting playing the first multimedia corresponding to the current multimedia playing request in the first application, generating and presenting a push entry of a second application that meets the current playing request for playing the first multimedia, wherein the push entry is a playing component linked to a playing page corresponding to the first multimedia in the second application;

in response to a trigger operation for the push entry of the second application, jumping from the first application to the second application, wherein identifying whether the current playing request is beyond operation permissions of the user according to the historical playing record of the user in the first application includes:

identifying that the current playing request is beyond the operation permissions of the user if the current playing request and the historical playing record meet at least one of the following conditions:

a playing object of the current playing request overlaps with a playing object in the historical playing record; or a number of plays of the historical playing record reaches a preset upper limit of the number of plays.

9. The electronic device according to claim 8, wherein identifying whether the current playing request is beyond operation permissions of the user according to the historical playing record of the user in the first application further includes:

acquiring the historical playing record of the user in the first application.

10. The electronic device according to claim 8, wherein presenting the push entry of the second application includes:

presenting the push entry in an operation page of the current playing request.

11. The electronic device according to claim 8, wherein presenting a push entry of a second application includes:

presenting the push entry in a push page.

12. A non-transitory storage medium containing computer executable instructions which, when being executed by a computer processor, are used for performing an application push method comprising:

acquiring a current playing request for playing first multimedia initiated by a user in a first application;

identifying whether the current playing request is beyond operation permissions of the user in the first application according to a historical playing record of the user in the first application;

if the current playing request is beyond operation permissions of the user in the first application, rejecting playing the first multimedia corresponding to the current multimedia playing request in the first application, generating and presenting a push entry of a second application that meets the current playing request for playing the first multimedia, wherein the push entry is a playing component linked to a playing page corresponding to the first multimedia in the second application;

in response to a trigger operation for the push entry of the second application, jumping from the first application to the second application, wherein identifying whether the current playing request is beyond operation permissions of the user according to the historical playing record of the user in the first application includes:

identifying that the current playing request is beyond the operation permissions of the user if the current playing request and the historical playing record meet at least one of the following conditions:

a playing object of the current playing request overlaps with a playing object in the historical playing record; or a number of plays of the historical playing record reaches a preset upper limit of the number of plays.

13. The non-transitory storage medium according to claim 12, wherein identifying whether the current playing request is beyond operation permissions of the user according to the historical playing record of the user in the first application further includes:

acquiring the historical playing record of the user in the first application.

14. The non-transitory storage medium according to claim 12, wherein presenting the push entry of the second application includes:

presenting the push entry in an operation page of the current playing request.

* * * * *